United States Patent
Igarashi

(10) Patent No.: US 6,776,384 B2
(45) Date of Patent: Aug. 17, 2004

(54) SEAT OF VEHICLE

(75) Inventor: Yasunori Igarashi, Kiryu (JP)

(73) Assignee: Shigeru Co., Ltd., Tokyo (JP)

( * ) Notice: Subject to any disclaimer, the term of this patent is extended or adjusted under 35 U.S.C. 154(b) by 0 days.

(21) Appl. No.: 10/292,615

(22) Filed: Nov. 12, 2002

(65) Prior Publication Data

US 2004/0090100 A1 May 13, 2004

(51) Int. Cl.$^7$ ................................................ F16M 13/00
(52) U.S. Cl. ........................................ 248/421; 248/419
(58) Field of Search ................................ 248/419, 421, 248/588, 620; 297/344.15

(56) References Cited

U.S. PATENT DOCUMENTS

| | | | | |
|---|---|---|---|---|
| 3,826,457 A | * | 7/1974 | Huot de Longchamp | ... 248/564 |
| 4,195,883 A | * | 4/1980 | Ronnhult et al. | ........ 297/303.4 |
| 4,573,657 A | * | 3/1986 | Sakamoto | ................... 248/575 |
| 5,251,864 A | * | 10/1993 | Itou | ........................... 248/588 |
| 5,794,911 A | | 8/1998 | Hill | ............................ 248/588 |
| 5,984,410 A | * | 11/1999 | Brodersen | .................. 297/339 |

FOREIGN PATENT DOCUMENTS

| | | | | | |
|---|---|---|---|---|---|
| GB | 20417450 A | * | 9/1980 | | |
| JP | 04-504549 | | 8/1992 | | |
| JP | 406316233 A | * | 11/1994 | ........... | 297/344.15 |
| JP | 10-16622 | | 1/1998 | | |
| WO | WO 90/11841 A1 | | 10/1990 | | |

* cited by examiner

*Primary Examiner*—Leslie A. Braun
*Assistant Examiner*—Jon Szumny
(74) *Attorney, Agent, or Firm*—Brown & Michaels PC.; Eugene Stephens & Associates

(57) ABSTRACT

A seat of a vehicle comprises an upper and a lower frame 10, 20 and a first and a second link 31, 32 of an X-shape disposed therebetween. A front end portion (one end portion) of a suspension spring 40 is locked to the lower frame 20, and a rear portion (the other end portion) of this spring 40 is locked to a slide member 50. An inclination cam face 52a of this slide member 50 is in abutment with an abutment projection 35 (abutment member) disposed at the first link 31. By this, vibration absorbing capability of the suspension spring can sufficiently be obtained even if the distance between the upper frame and the lower frame is reduced.

4 Claims, 5 Drawing Sheets

SEAT OF VEHICLE

BACKGROUND OF THE INVENTION

This invention relates to a seat used for a vehicle such as, for example, a shovel car, a tractor and the like.

FIG. 5 shows one example of a conventional seat of a vehicle. This seat includes a pair of frames (an upper frame and a lower frame) 1, 2 disposed vertically away from each other, and a pair of links 3, 4 of an X-shape disposed between the upper frame 1 and the lower frame 2. Those links 3, 4 are rotatably connected to each other at their intermediate parts. The front end portions of the links 3, 4 are slidably connected to the frames 1, 2, and the rear end portions thereof are rotatably connected to the frames 1, 2. Owing to the foregoing arrangement, the upper frame 1 can make a vertical movement between an uppermost position indicated by a solid line of FIG. 5 and a lowermost position indicated by an imaginary line of FIG. 5 while maintaining its parallel posture with respect to the lower frame 2. A front end portion of the suspension spring 5 is connected to the link 3, and a rear end portion of the spring 5 is connected to the upper frame 1. Owing to the foregoing arrangement, the link 3 is biased in the rising direction, thereby supporting the upper frame 1 elastically. The spring force of the suspension spring 5 is adjusted such that the frame 1 is located at an intermediate position between the uppermost position and the lowermost position, under the condition that a passenger sits on a cushion 6 which is placed on the upper frame 1. When vibration of the vehicle is transmitted to the seat, the links 3, 4 are rotated and the suspension spring 5 is expanded/contracted, thereby absorbing the vibration.

As shown in FIG. 6, it has heretofore been demanded for a vehicle seat to increase the thickness of the cushion 6 and to enlarge the space in the cabin by reducing, as much as possible, the distance between the upper frame 1 and the lower frame 2 in the uppermost position. However, if this demand should be satisfied, the links 3, 4 would be greatly folded and therefore, the suspension spring 5 would be merely slightly expanded/contracted with respect to rotation of the link 3 and the increasing/decreasing amount of the spring force would be small. Accordingly, only with a slight variation of the external force, the upper frame 1 would reach the uppermost or lowermost position, thus providing a shock. Accordingly, the passenger's sitting comfort is degraded.

The present invention has been made in view of the above situation. It is, therefore, an object of the present invention to provide a seat of a vehicle in which vibration absorbing capability of a suspension spring can be obtained sufficiently even if a distance between frames is reduced.

SUMMARY OF THE INVENTION

In order to achieve the above object, the features of the present invention reside in a seat of a vehicle comprising (A) a pair of frames disposed vertically away from each other; (B) a parallel maintaining mechanism including a first link and a second link which are rotatably connected to each other at intermediate parts thereof to form an X-shape, the first link being slidably connected at an upper end portion thereof to an upper frame and rotatably connected at a lower end portion thereof to a lower frame, the second link being rotatably connected at an upper end portion thereof to the upper frame and slidably connected at a lower end portion thereof to the lower frame; (C) a slide member slidably disposed at one of the upper frame and the lower frame; (D) a suspension spring extending along the one frame, one end portion of the suspension spring being connected to the one frame and the other end portion being connected to the slide member; and (E) cam means disposed between one of the first link and the second link and the slide member and adapted to convert rotation of the link into sliding movement of the slide member and hence into expansion/contraction of the suspension spring; the suspension spring biasing the one link in a rising direction through the slide member and cam means, thereby supporting the upper frame. Owing to the foregoing construction, by making the folding angle of the link in the uppermost position, the distance between the upper frame and the lower frame can be reduced, the cushion can be increased in thickness and the cabin can be enlarged in space. Moreover, since the expanding/contracting amount of the suspension spring can be increased by the cam means, the vibration transmitted to the seat can fully be absorbed, and an enhanced riding comfort can be obtained.

It is preferred that the cam means includes an abutment member disposed at the one link, and an inclination cam face formed on the slide member and brought into abutment with the abutment member by the suspension spring. Owing to the foregoing arrangement, the construction of the cam means can be simplified.

Preferably, the cam face becomes gentle in gradation towards the one frame. Owing to the foregoing arrangement, the upper frame can be restrained from lowering and the bottom touching feel can surely be prevented.

It is preferred that the first and second links and the slide member are slid in a back and forth direction and the suspension spring is extended in a back and forth direction. Owing to the foregoing arrangement, the seat can be made compact.

Preferably, a pair of the first and second links and a pair of the cam means are provided on each of left and right side portions of the frame, a slide member is extended leftwards and rightwards, and opposite end portions of the slide member are connected to the one link through the cam means. Owing to the foregoing arrangement, the left and right links and the suspension spring can be connected through only one slide member and a reliable cam action can be obtained with a simple construction.

DETAILED DESCRIPTION OF THE INVENTION

One embodiment of the present invention will now be described with reference to the drawings.

Figure 1:
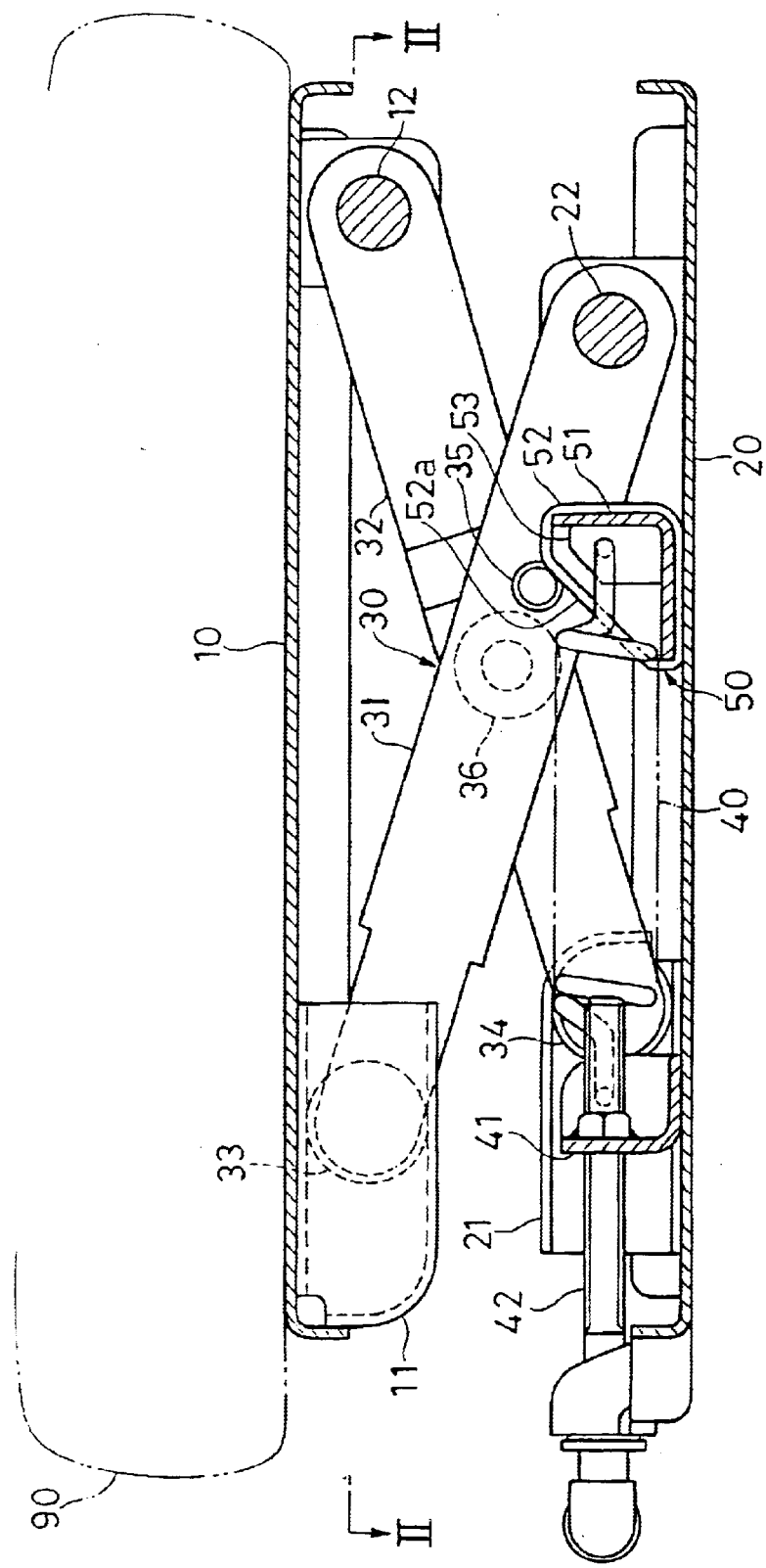
FIG. 1 is a side sectional view showing a state of a seat of a vehicle according to one embodiment of the present invention, in which an upper frame is in an uppermost position.
Figure 2:
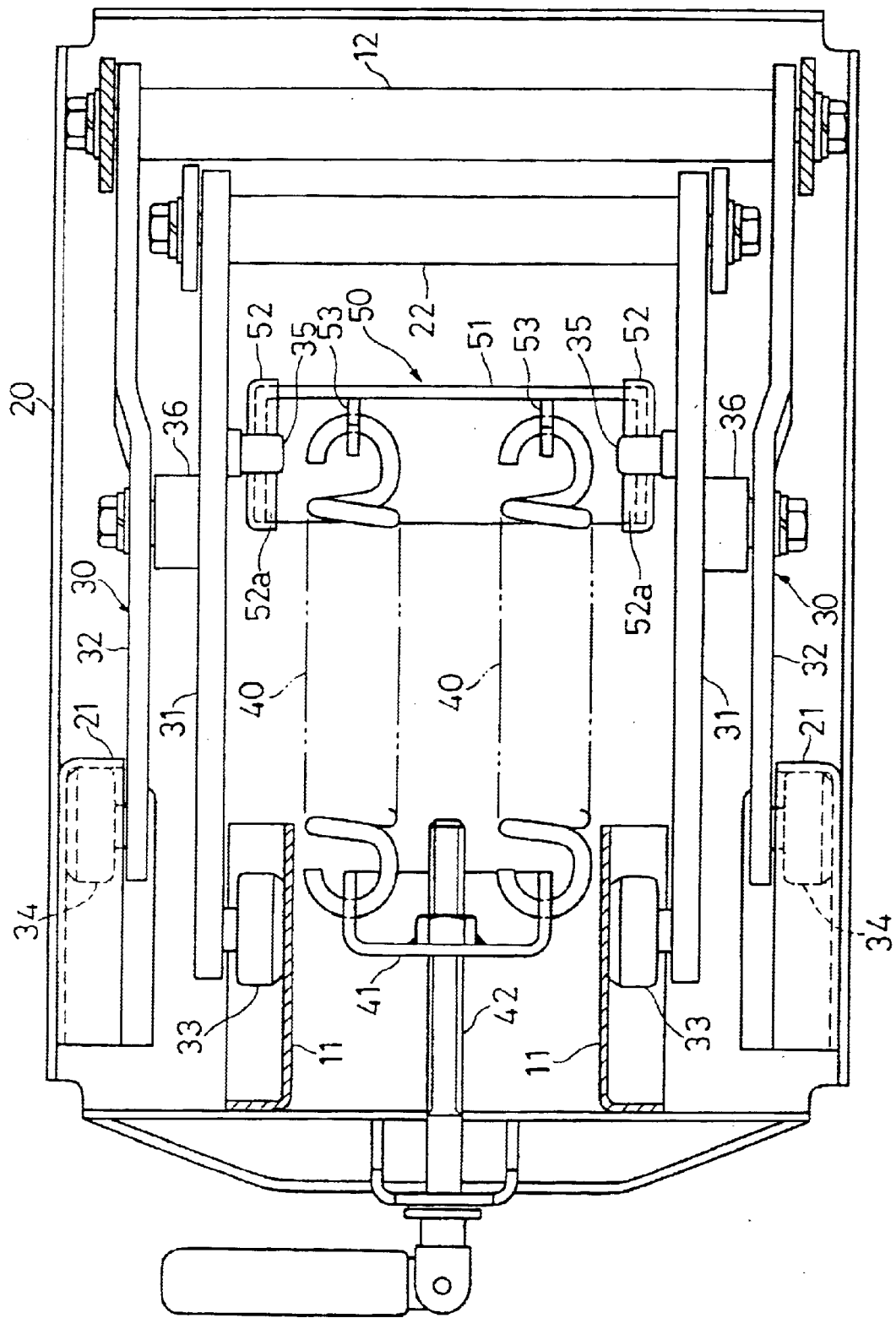
FIG. 2 is a plan sectional view of the vehicle seat taken on line II—II of FIG. 1.

As shown in FIGS. 1 and 2, a seat of a vehicle comprises a pair of frames 10, 20 disposed vertically away from each other, and a parallel maintaining mechanism 30 disposed between those frames 10, 20. The lower frame 20 is fixed to the floor (not shown) of a cabin, and a cushion 90 with a backrest (not shown) is placed on the upper frame 10.

The parallel maintaining mechanism 30 includes first and second links 31, 32, one pair each being provided to each of the left and right portions (upper and lower portions of FIG. 2). Those links 31, 32 are rotatably connected to each other at their intermediate parts through a connection shaft 36, thereby forming an X-shape. A front end portion (upper end portion) of the first link 31 is slidably connected to a slide guide 11 of the upper frame 10 through a guide roller 33. A rear end portion (lower end portion) of the first link 31 is rotatably connected to the lower frame 20 through a connection shaft 22. Similarly, a front end portion (lower end portion) of the second link 32 is slidably connected to a slide guide 21 of the lower frame 20 through a guide roller 34, and a rear end portion (upper end portion) thereof is rotatably connected to the upper frame 10 through a connection shaft 12.

Figure 3:
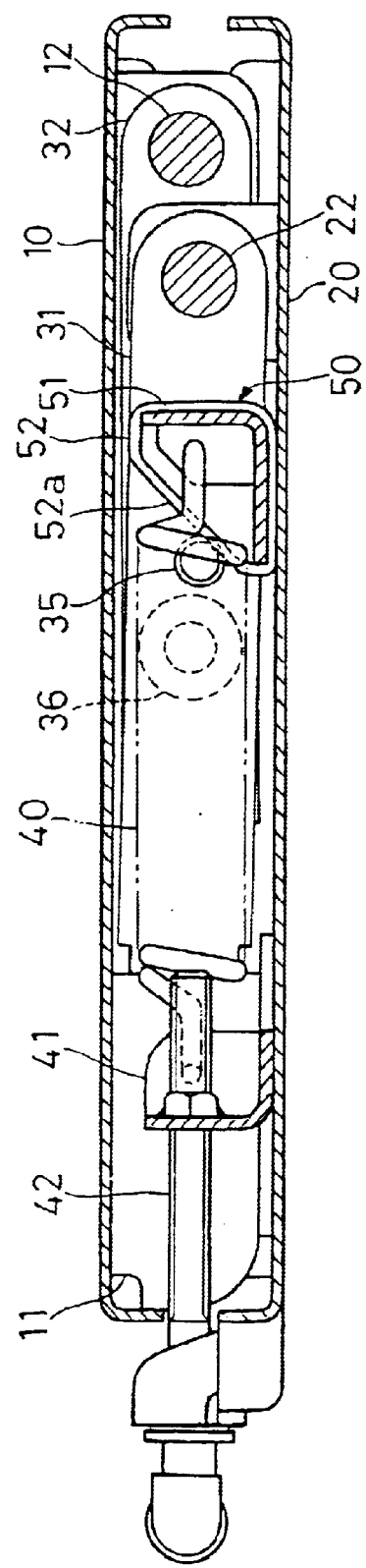
FIG. 3 is a side sectional view showing a state of the vehicle seat, in which the upper frame is in a lowermost position.

Owing to this parallel maintaining mechanism 30, the upper frame 10 can make a vertical movement between an uppermost position shown in FIGS. 1 and 2 and a lowermost position shown in FIG. 3 while maintaining its parallel posture with respect to the lower frame 20. In accordance with this vertical movement, the front end portions of the links 31, 32 are slid in a back and forth direction and the rear end portions thereof are rotated. The uppermost position of the upper frame 10 is established by abutment of the guide roller 34 of the second link 32 against the rear end portion of the slide guide 21. As shown in FIG. 3, the links 31, 32 are generally horizontal in the lowermost position.

As shown in FIGS. 1 and 2, a slide member 50 and a pair of left and right suspension springs 40 composed of a tension coiled spring are arranged on the lower frame 20. The slide member 50 includes a steel-made (metal-made) angle plate 51 extending in a left and right direction (orthogonal direction to the sliding direction) in an L-shape in section, and a pair of slide portions 52 disposed at opposite end portions of this angle plate 51. The slide portions 52 are formed from a material having a small friction coefficient such as resin, such as, for example, nylon into a generally right-angled triangular shape and slidably placed on the lower frame 20.

The suspension spring 40 is extended in a back and forth direction. A front end portion (one end portion) of the suspension spring 40 is connected to the lower frame 20 through a connection shaft 41 and an adjustment screw 42, and a rear end portion (the other end portion) thereof is connected to a connection plate 53 which is disposed at the angle plate 51. By this suspension spring 40, the slide member 50 is biased forwards, thereby bringing an inclination surface 52a (cam face) of the slide portion 52 into abutment with a circular column-like abutment projection 35 (abutment member) disposed at an intermediate part of the first link 31. By this, the first link 31 is biased in a rising direction and the upper frame 10 is supported elastically. With a passenger sitting on the cushion 90, this upper frame 10 is located height-wise in an intermediate position between the uppermost position and the lowermost position. In that state, the spring force of the suspension spring 40 is adjusted so as to be well balanced with the static load of the passenger and the cushion 90 by the adjustment screw 42.

The "cam means" recited in claims is constituted by the abutment projection 35 and the inclination surface 52a of the slide member 50. (The cam means is provided between the first link 31 and the slide member 50).

Operation of the seat of a vehicle thus constructed will now be described.

As shown in FIG. 1, in the seat of a vehicle, when the upper frame 10 is in its uppermost position, the links 31, 32 are comparatively greatly inclined and the distance between the upper frame 10 and the lower frame 20 is reduced. Accordingly, to that extent, the cushion 90 can be increased in thickness and the cabin can be enlarged in space. For example, in the conventional product, the folding angle of the links is about 60 degrees in the uppermost position and the distance between the upper frame and the lower frame is about 26 cm. On the other hand, in the product to which the present invention is applied, the folding angle of the links can be set to about 72 degrees and the distance between the upper frame and the lower frame can be set to about 10 cm.

Moreover, the seat of a vehicle according to the present invention has a sufficient vibration absorbing capability even if the folding angle of the links 31, 32 is so large as the above-mentioned angle. That is, with a passenger sitting on the cushion 90 (the state in which the upper frame 10 is height-wise located at the intermediate part), when the lower frame 10 is subjected to a shock load directing upwards, the links 31, 32 are further folded. That is, the first link 31 is rotated in a counterclockwise direction in FIG. 1. At that time, the slide member 50 is greatly slid backwards against the suspension spring 40 under the cam action of the abutment projection 35 and the inclination surface 52a. By this, the suspension spring 40 can be expanded greatly and an amount of increase of the spring force can be further enhanced, thereby improving the riding comfort.

In the slide member 50 of this embodiment, since the inclination surface 52a is flat, manufacture is easy.

Although not shown, a cushion absorber is disposed between the upper frame 10 and the lower frame 20 and the continuous vibration of the suspension spring 40 itself can be restrained by the cushion absorber.

Figure 4:
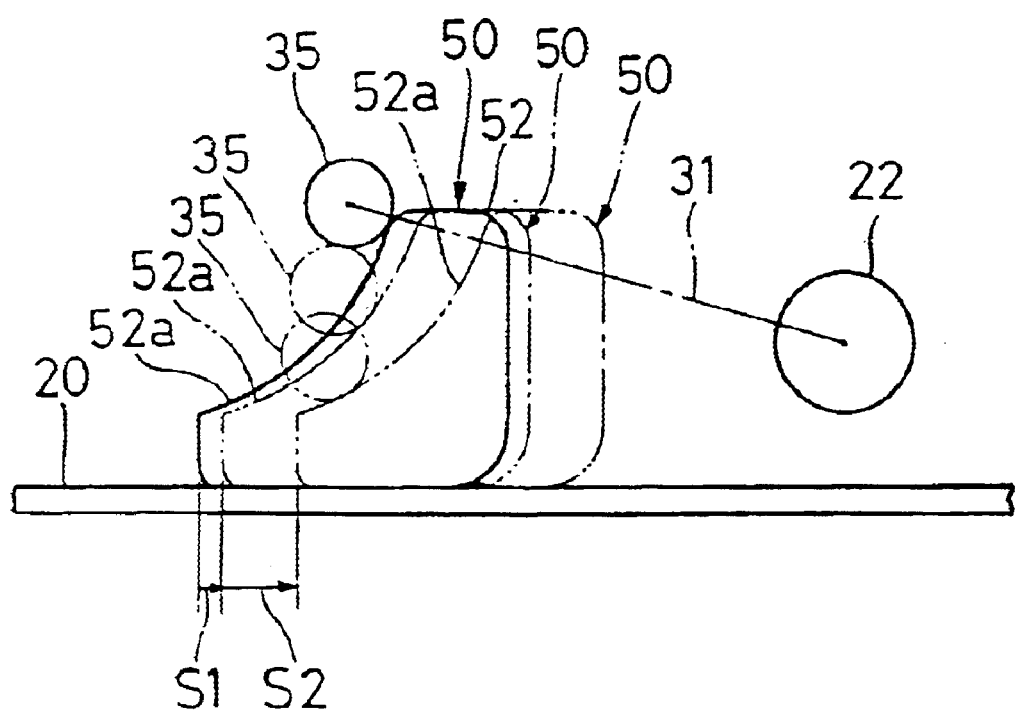
FIG. 4 is a side view showing another embodiment of the present invention.
Figure 5:
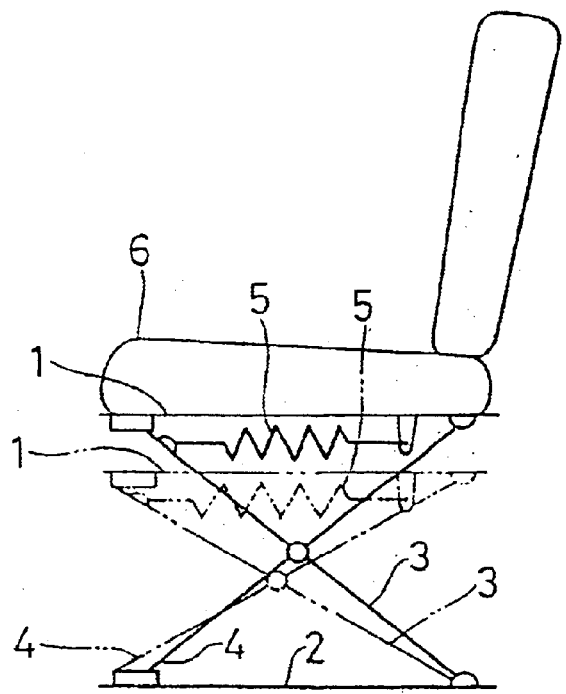
FIG. 5 is a schematic side view of the conventional construction.
Figure 6:
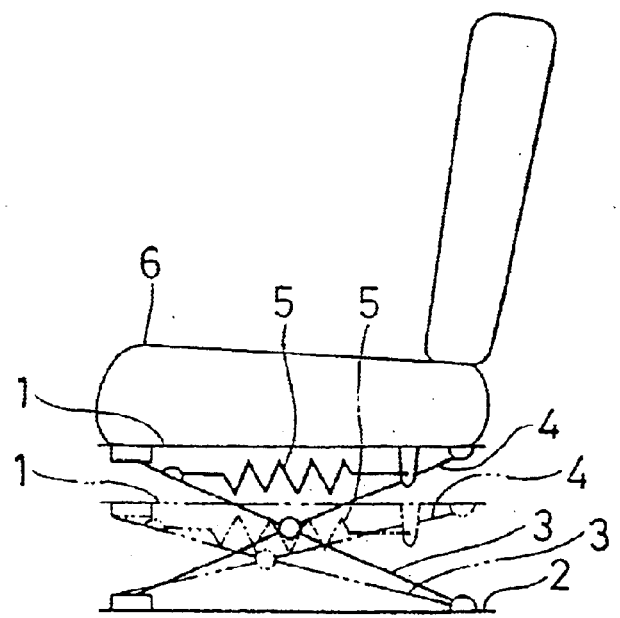
FIG. 6 is a schematic side view showing the above conventional construction presuming that a distance between the upper frame and the lower frame is small.

FIG. 4 shows another embodiment of the present invention. The inclination surface 52a of the slide member 50 according to this embodiment becomes gentle in gradient towards the lower frame 20. Owing to this arrangement, as the folding angle of the first link 31 is increased, the sliding amount of the slide member 50 is increased (S2>S1). Thus, the suspension spring 40 is more greatly expanded and its spring force is greatly increased. Moreover, by the abutment projection 35, the force for pressing the slide member 50 against the frame 20 is also increased and friction between the slide member 50 and the frame 20 is also increased. As a consequence, the upper frame can be restrained from being lowered and the bottom touching feel can be eliminated.

The present invention is not limited to the above embodiments and various modifications can be made.

For example, the suspension spring may be a compression spring, a pneumatic suspension or the like.

It is also accepted that one end portion of the suspension spring is locked to the upper frame and the slide member, which is locked to the other end portion of the suspension spring, is slidably disposed at the upper frame.

The cam means may be disposed between the slide member and the second link (the abutment member may be disposed at the second link).

Instead of the slide member, the cam face may be disposed at the link.

It is also accepted that the suspension spring is connected to the end portion on the slide side of the link through the cam means and the slide member.

What is claimed is:

1. A seat of a vehicle comprising:

(A) a pair of frames including an upper frame and a lower frame disposed vertically away from each other;

(B) a parallel maintaining mechanism including a first link and a second link which are rotatably connected to each other at intermediate parts thereof to form an X-shape, said first link being slidably connected at an upper end portion thereof to said upper frame and rotatably connected at a lower end portion thereof to said lower frame, said second link being rotatably connected at an upper end portion thereof to said upper frame and slidably connected at a lower end portion thereof to said lower frame;

(C) a slide member slidably disposed at one of said upper frame and said lower frame;

(D) a suspension spring extending along said one frame, one end portion of said suspension spring being connected to said one frame and the other end portion being connected to said slide member; and (E) cam means disposed between one of said first link and said second link and said slide member and adapted to convert rotation of said link into sliding movement of said slide member and hence into expansion/contraction of said suspension spring;

said suspension spring biasing said one link in a rising direction through said slide member and cam means, thereby supporting said upper frame, said cam means includes an abutment member disposed at said one link, and an inclination cam face formed on said slide member and brought into abutment with said abutment member by said suspension spring.

2. The seat of a vehicle according to claim 1, wherein said cam face becomes gentle in gradation towards said one frame.

3. The seat of a vehicle according to claim 1, wherein said first and second links and said slide member are slid in a back and forth direction and said suspension spring is extended in a back and forth direction.

4. The seat of a vehicle according to claim 3 wherein a pair of said first and second links and a pair of said cam means are provided on each of left and right side portions of said frame, said slide member is extended leftwards and rightwards, and each of the opposite ends of said slide member is respectively connected to said one link through said cam means.

* * * * *